US009903747B2

(12) United States Patent
Rizun

(10) Patent No.: US 9,903,747 B2
(45) Date of Patent: Feb. 27, 2018

(54) DEVICE AND METHOD FOR DISPERSING PASTE-LIKE OR STICKY NUTRITIONAL SUBSTANCE IN A FLUID

(71) Applicant: Nodari Rizun, San Diego, CA (US)

(72) Inventor: Nodari Rizun, San Diego, CA (US)

( * ) Notice: Subject to any disclaimer, the term of this patent is extended or adjusted under 35 U.S.C. 154(b) by 196 days.

(21) Appl. No.: 14/939,731

(22) Filed: Nov. 12, 2015

(65) Prior Publication Data

US 2017/0136423 A1    May 18, 2017

(51) Int. Cl.
| | |
|---|---|
| *G01F 19/00* | (2006.01) |
| *G01F 23/04* | (2006.01) |
| *B05C 17/00* | (2006.01) |
| *A23L 1/06* | (2006.01) |
| *A23L 1/08* | (2006.01) |
| *A23L 1/015* | (2006.01) |

(52) U.S. Cl.
CPC .......... *G01F 19/005* (2013.01); *A23L 1/015* (2013.01); *A23L 1/06* (2013.01); *A23L 1/08* (2013.01); *B05C 17/00* (2013.01); *G01F 19/00* (2013.01); *G01F 23/04* (2013.01)

(58) Field of Classification Search
CPC ........ G01F 19/005; G01F 19/00; G01F 23/04; A23L 1/015; A23L 1/06; A23L 1/08; B05C 17/00
See application file for complete search history.

(56) References Cited

U.S. PATENT DOCUMENTS

| | | | | |
|---|---|---|---|---|
| 34,943 A | * | 4/1862 | Chinnock | G01F 19/00 73/322 |
| 353,055 A | * | 11/1886 | Dorr | G01F 19/00 30/141 |
| 379,692 A | * | 3/1888 | Elliott | G01F 23/04 116/227 |
| 645,875 A | * | 3/1900 | Strauss | G01F 19/00 33/721 |
| 1,000,178 A | * | 8/1911 | Kahl | B23D 59/006 222/192 |
| 1,466,043 A | * | 8/1923 | Graham | B65D 35/40 222/106 |
| 1,881,316 A | * | 10/1932 | Horvath | B65D 83/06 206/525 |
| 2,027,494 A | * | 1/1936 | Trabold | G01F 19/00 33/486 |

(Continued)

OTHER PUBLICATIONS

Coolthings, "Mugstir Lets You Have a Coffee Spoon Without Turning You Into a Pirate", (2010) retrieved from http://www.coolthings.com/mugstir-coffee-spoon/, on Nov. 9, 2015, in 2 pages.

*Primary Examiner* — Randy Gibson
(74) *Attorney, Agent, or Firm* — Procopio, Cory, Hargreaves & Savitch LLP

(57) ABSTRACT

An elongate device for dispersing a paste-like or sticky substance in a liquid for consumption, injection, or topical use has an integral, outwardly directed hook at a first end for suspending the elongate device from the rim of a container such as a glass, cup, bottle or the like into the interior of the container. The elongate device has one or more scale markings at least on an inner face spaced from the second end of the device for indicating an amount of paste-like substance adhered to a second end portion between a scale marking and the second end.

14 Claims, 4 Drawing Sheets

(56) References Cited

U.S. PATENT DOCUMENTS

| | | | | |
|---|---|---|---|---|
| 2,169,952 A * | 8/1939 | Holmes | G01F 23/04 | 33/719 |
| D140,049 S * | 1/1945 | Davis | | 30/115 |
| 2,597,275 A * | 5/1952 | Ahlstrand | A47G 21/145 | 131/257 |
| 2,607,122 A * | 8/1952 | Overmyer | G01F 23/04 | 33/723 |
| 2,628,742 A * | 2/1953 | Kierulff | B65D 35/40 | 141/381 |
| 2,720,114 A * | 10/1955 | Truffa | G01F 19/00 | 73/428 |
| 2,802,266 A * | 8/1957 | Huxhold | G01F 19/005 | 30/115 |
| 2,984,064 A * | 5/1961 | Wentsel | G04F 1/06 | 368/95 |
| 3,006,314 A * | 10/1961 | Malec | G01F 23/04 | 116/227 |
| 3,745,659 A * | 7/1973 | Hsu | G01F 23/04 | 210/502.1 |
| 4,294,273 A * | 10/1981 | Isberg | B01F 15/0491 | 137/1 |
| 4,433,597 A * | 2/1984 | Rowland | B67B 7/16 | 7/151 |
| 4,445,370 A * | 5/1984 | Whitmire | F01M 3/00 | 116/227 |
| 4,531,293 A * | 7/1985 | Grinde | G01F 23/04 | 116/227 |
| 4,550,602 A * | 11/1985 | Burke, Sr. | G01F 23/02 | 116/227 |
| 5,318,371 A * | 6/1994 | Niewulis | B05C 17/00 | 2/160 |
| 5,383,373 A * | 1/1995 | Knowles, Jr. | G01F 11/00 | 222/1 |
| 5,438,886 A * | 8/1995 | Knowles, Jr. | G01F 11/00 | 222/106 |
| 5,566,465 A * | 10/1996 | Zoellner | B44D 3/08 | 33/572 |
| 5,758,540 A * | 6/1998 | Davila | B67D 1/08 | 73/426 |
| 5,863,431 A * | 1/1999 | Salzburg | A47J 31/08 | 206/0.5 |
| 5,922,349 A * | 7/1999 | Elliesen | A61K 9/06 | 424/434 |
| 7,258,004 B2 * | 8/2007 | Bensussan | G01F 19/005 | 33/729 |
| 7,263,893 B2 * | 9/2007 | Kosmyna | B01F 13/002 | 73/726 |
| 7,350,418 B2 * | 4/2008 | Kosmyna | B01F 13/002 | 73/726 |
| 8,256,130 B2 * | 9/2012 | Jantz | A47J 43/28 | 116/227 |
| 9,759,595 B1 * | 9/2017 | Morgan | G01F 19/00 | |
| 2010/0089151 A1 * | 4/2010 | Mantilla | G01F 19/002 | 73/426 |
| 2013/0078337 A1 * | 3/2013 | Elfstrum | B65D 85/808 | 426/78 |
| 2016/0185582 A1 * | 6/2016 | Crane | B67B 7/0423 | 81/3.09 |
| 2017/0167908 A1 * | 6/2017 | Rizun | G01F 19/005 | |

* cited by examiner

DEVICE AND METHOD FOR DISPERSING PASTE-LIKE OR STICKY NUTRITIONAL SUBSTANCE IN A FLUID

BACKGROUND

1. Field of the Invention

This invention relates generally to paste-like, sticky or resinous edible or nutritional substances, and is particularly concerned with a device and method for dispersing and dissolving such substances in a fluid.

2. Related Art

Many health substances or nutritional substances come in paste-like or thick, sticky liquid forms, for example mineral pitch resin, shilajit, mumie, nutritive jams, honeys and syrups, and the like. Resinous pastes are often preferred by users over liquids and powders because they are more natural and authentic (less processed) and are believed to have higher efficacy. However, resinous pastes often have less than favorable taste, smell and consistency, and are difficult to accurately measure and consume. Another problem with resinous pastes is that the pure material is quite expensive, so they are often counterfeited and mixed with fillers and bulking agents.

SUMMARY

According to one aspect, a device for dispersing a paste-like or sticky nutritional substance into a liquid is provided, which comprises an elongate member having opposite first and second ends and an integral, outwardly directed hook at the first end for suspending the elongate member from the rim of a container such as a glass, cup, jar, bottle or the like into the interior of the container, the elongate member having an outer face and an inner face, and a collection portion or metered end portion at least on the inner face extending up to the second end and having a scale marking for indicating an amount of paste-like substance adhered to the metered end portion between the scale marking and second end.

In one embodiment, the elongate member is a flat strip of metal or other rigid or semi-rigid material, bent to form the hook at its first end, with the metered end portion at its second end. The scale marking may comprise one or more lines imprinted or indented on the inner face of the member and spaced at a predetermined distance or distances from the second end. In alternative embodiments, the second or metered end portion of the member may be curved, indented, or spoon-like with a suitable scale marking. The scale marking may be provided on both faces of the device, and may alternatively comprise an indentation of predetermined dimensions.

According to another aspect, a method of dispersing a paste-like, resinous or sticky substance in a liquid is provided, which comprises inserting a metered end portion of a dispensing device into a container of the paste-like substance so that a quantity of the substance adheres to the metered end portion, suspending the metered end portion and paste-like or sticky substance adhered to the device into a quantity of liquid in a container with a hooked end of the device engaging over a rim of the container, and waiting for the substance to disperse and dissolve into the liquid before removing the dispensing device from the container. The resultant solution may be ingested, injected, or inserted, or may be applied topically to the skin.

If desired, the user may agitate the device in the liquid so that it dissolves more quickly. However, the substance dissolves on its own without the necessity of agitating the device. If a glass or transparent container is used, the user may also readily observe if any solid, non-soluble fillers or bulking agents are present in the paste-like substance, since such materials will typically sink to the bottom of the container as the paste dissolves or disperses. This allows the user to monitor quality or purity of the substance.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a dispersing or dispensing device for dispersing a metered or roughly metered amount of a paste-like or sticky nutritional material into a liquid or fluid, such as a mineral pitch resin paste, shilajit, mumie, or nutritive jams, honeys and syrups.

After reading this description it will become apparent to one skilled in the art how to implement the invention in various alternative embodiments and alternative applications. However, although various embodiments of the present invention will be described herein, it is understood that these embodiments are presented by way of example only, and not limitation.

Figure 1:
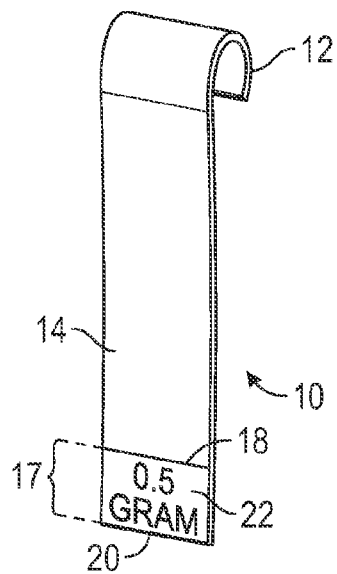
FIG. 1 is a front perspective view of a first embodiment of a device for dispensing a paste-like substance in a liquid.
Figure 2:
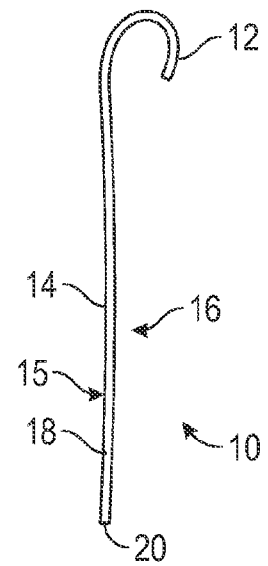
FIG. 2 is a side elevation view of the device of FIG. 1.
Figure 3:
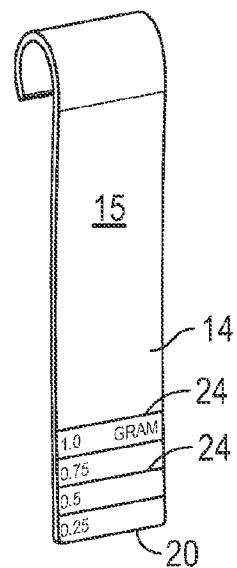
FIG. 3 is front elevation view of a modified second embodiment of the device which has a modified metered end portion with a different scale marking.

FIGS. 1 and 2 illustrate a first embodiment of a device 10 for dispersing a paste-like substance or sticky material into a liquid for consumption, injection, topical application, or the like, while FIG. 3 is a modified second embodiment which has a lower end portion with a modified scale marking, as described in more detail below.

Figure 5:
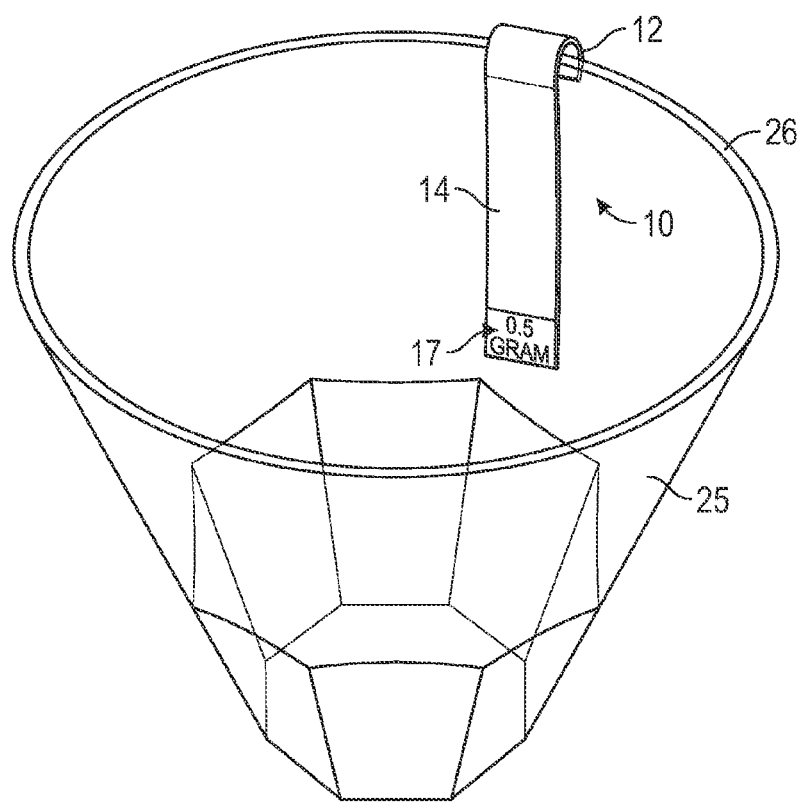
FIG. 5 is a perspective view illustrating the device of FIGS. 1 and 2 hung over the rim of a glass.
Figure 6:
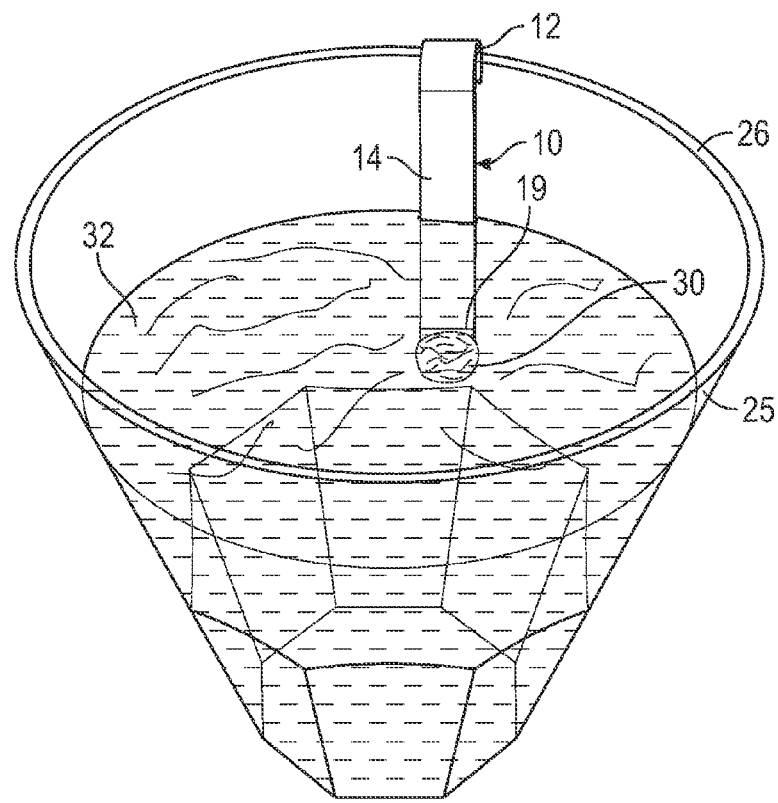
FIG. 6 is a perspective view illustrating a quantity of a paste-like material adhered to the metered lower end of the device and suspended in a liquid in the glass.

Device 10 comprises an elongate, strip-like member 14 having opposite first and second ends and an integral, outwardly directed hook 12 at the first end for suspending the elongate member from the rim of a container such as a glass, cup, jar, bottle or the like into the interior of the container, as illustrated in FIGS. 5 and 6. The elongate member has a front face 15, a rear or outer face 16, and a metered end portion 17 on at least the front face 15 located at the second end 20. Metered end portion 17 includes a scale marking 18 is at least on the front face of the device which is spaced from the second end 20 for indicating an amount of paste-like substance adhered to the second or metered end portion 17 between the scale marking or line 18 and second end 20. Indicia 22 may be provided to indicate the approximate amount of material adhered to the device if collected to the level of scale marking or line 18. An identical scale marking and indicia may be provided at the lower end of the rear face of the device, or the rear face may have no markings, with the scale marking at the metered end portion of front face 15 only.

Figure 4:
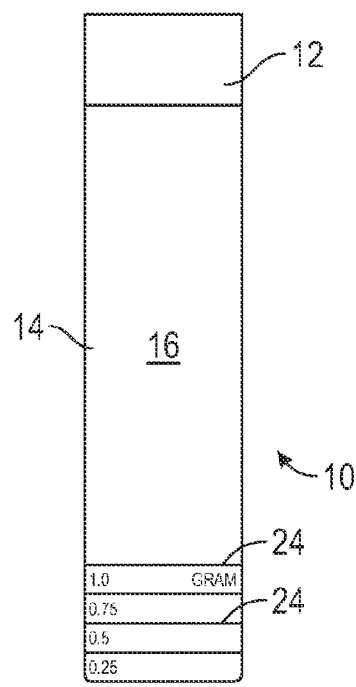
FIG. 4 is a rear elevation view of the device of FIG. 3.

In the embodiment of FIGS. 1 and 2, only one scale line and associate indicia (in this case 0.5 grams) are imprinted or etched on the front face and optionally also on the outer or back face. FIG. 3 illustrates an alternative embodiment in which device 10 is modified to include multiple scale markings or lines 24 on the metered end portion at successive spaced intervals from the second end 20. Lines 24 are spaced at predetermined distances from the second end to allow for collection and dispersing of different amounts of material, for example corresponding to 0.25 grams, 0.5 grams, 0.75 grams, and 1.0 grams of material if collected on the device to the respective scale line, as illustrated in FIG. 3. The same markings may be provided on the rear or outer face 16 of the device, as illustrated in FIG. 4, or the outer face 16 may have no marking in alternative embodiments. The device of FIGS. 3 and 4 is otherwise identical to that of FIGS. 1 and 2, and like reference numbers have been used as appropriate.

In one embodiment, the elongate member of FIGS. 1 to 4 is a flat strip of metal such as stainless steel or the like or other rigid or semi-rigid material such as food grade plastic material, bent to form the hook at its first end. In alternative embodiments, the second end portion of the member may be curved, indented, or spoon-like for containing material to be dispersed, with or without a suitable scale marking. The scale markings and indicia may be provided on only the inner face or on both faces of the device, and may alternatively comprise an indentation of predetermined dimensions.

In one embodiment, the length of device 10 from the upper bent end of the hook to second end 20 was in the range from 1.9 to 2.1 inches, and the width of the strip was around 0.5 inches, in other words the height is approximately four times the width of the strip. The thickness of the metal or other material in this example was around 0.05 inches.

As illustrated in FIG. 5, the device 10 may be suspended into a container such as a glass 25 by engaging the hook 12 over the edge or lip 26 of the glass with the remainder of the member extending into the glass. The same technique may be used for suspending the device into other types of liquid containers, such as cups, bottles, bowls, glasses, and the like. In order to dispense a desired quantity of paste-like, resinous or sticky substance into any desired liquid such as water, tea, juice, or the like, the user first pours a desired amount of liquid into the container, such as glass 25 of FIG. 5. Metered end portion 17 of device 10 is then inserted into a container or jar of the paste-like substance so that a quantity or blob 30 of the substance adheres to the metered end portion up to line 19, and the device is then withdrawn from the container. The modified device with multiple scale markings as in FIG. 3 may be used in the same way, and allows different measured amounts of the substance to be adhered up to the desired scale line 24, depending on the amount of the substance which the consumer wishes to use. The metered end portion and paste-like or sticky substance 30 adhered to the end portion are then suspended into a quantity of liquid 32 or other medium in a container such as glass 25, as illustrated in FIG. 6, and the hooked end of the device is engaged over rim or lip 26 of the glass or other container. The user can then wait for the substance to disperse and dissolve into the liquid before removing the dispersing device from the container and using the resultant solution. The mixture of dissolved substance and liquid may be ingested, injected, inserted, or may be applied topically to the skin, depending on the nature and purpose of the substance.

If desired, the user may agitate the device 10 in the liquid so that the metered quantity 30 of paste-like material dissolves more quickly, although this is not necessary since the material will dissolve into the liquid with the device left in place in the position illustrated in FIG. 6. The user can also readily observe if any solid, non-soluble fillers or bulking agents are present in the paste-like substance, since such materials will typically sink to the bottom of the container as the paste dissolves or disperses. This allows the user to monitor quality or purity of the substance. The user may see this happening as the material disperses if a glass or transparent container along with a colorless or translucent liquid is used. Alternatively, once the material is all dispersed, the mixture can be poured carefully from the container to reveal any solid contaminants in the bottom of the glass or other container.

The devices described above may be used for dispersing and dissolving measured amounts of many health or nutritional substances which come in pastes or thick, sticky forms into a suitable liquid. Such pastes or sticky substances include, for example, mineral pitch resin, shilajit, mumie, nutritive jams, honeys and syrups, and the like. Resinous pastes such as mineral pitch resin are popular but often have less than favorable taste, smell and consistency, and are difficult to accurately measure and consume. Another problem with resinous pastes is that the pure material is quite expensive, so they are often counterfeited and mixed with fillers and bulking agents. The dispersing device described above makes it easier to dispense a measured amount of such materials into a liquid, which may make the material more palatable to consume and also allows the consumer to determine if the material is potentially counterfeit and mixed with fillers or bulking agents before consuming it.

Figure 7:
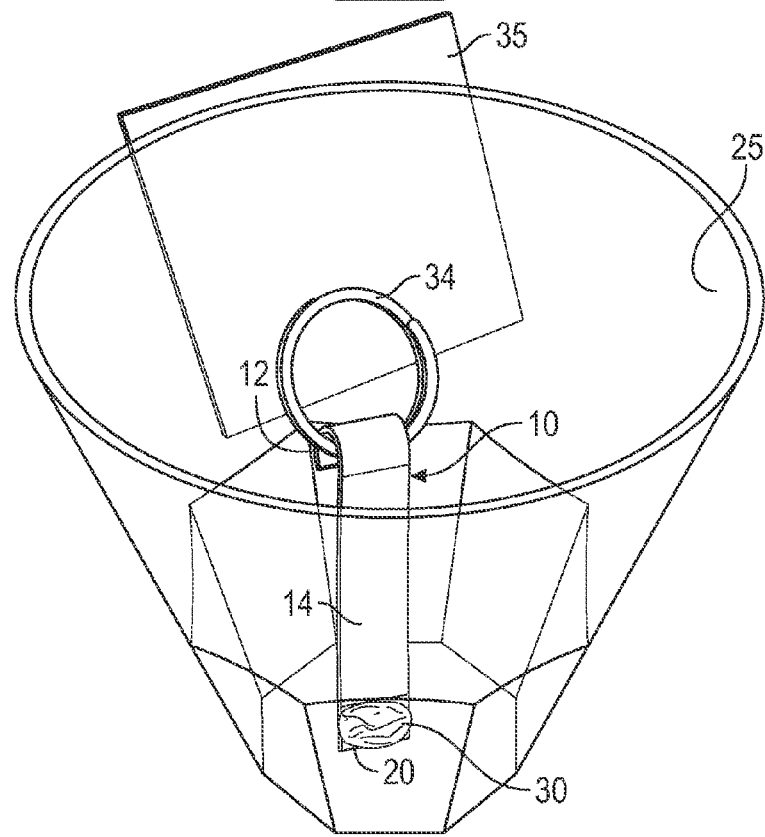
FIG. 7 is a perspective view illustrating a method of adjusting the position of the metered end of the device in a glass or other container.
Figure 8:
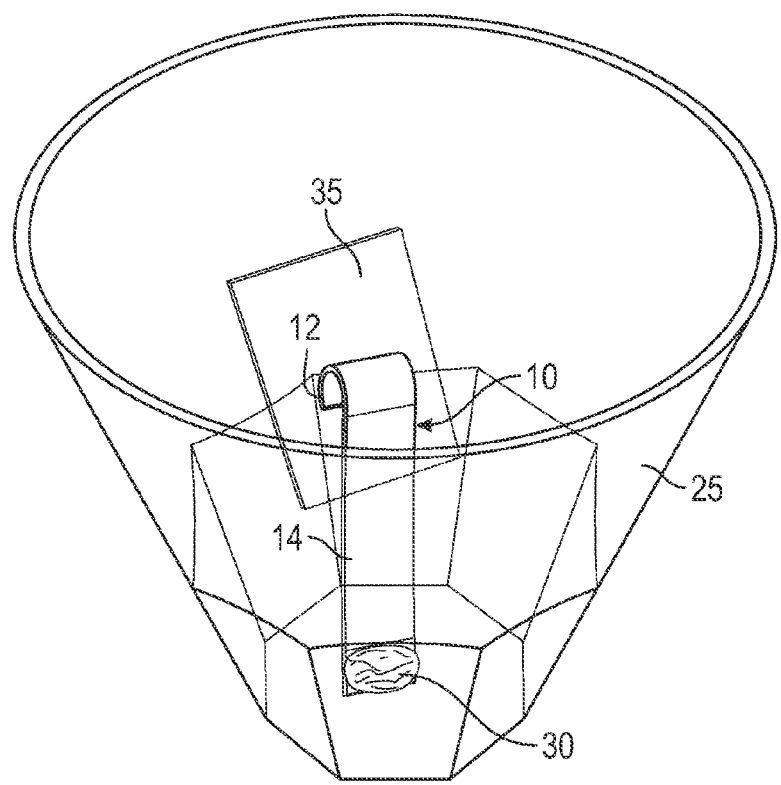
FIG. 8 is a similar view to FIG. 7 illustrating an alternative technique for suspending the device at a lower level in a glass or other container.
Figure 9:
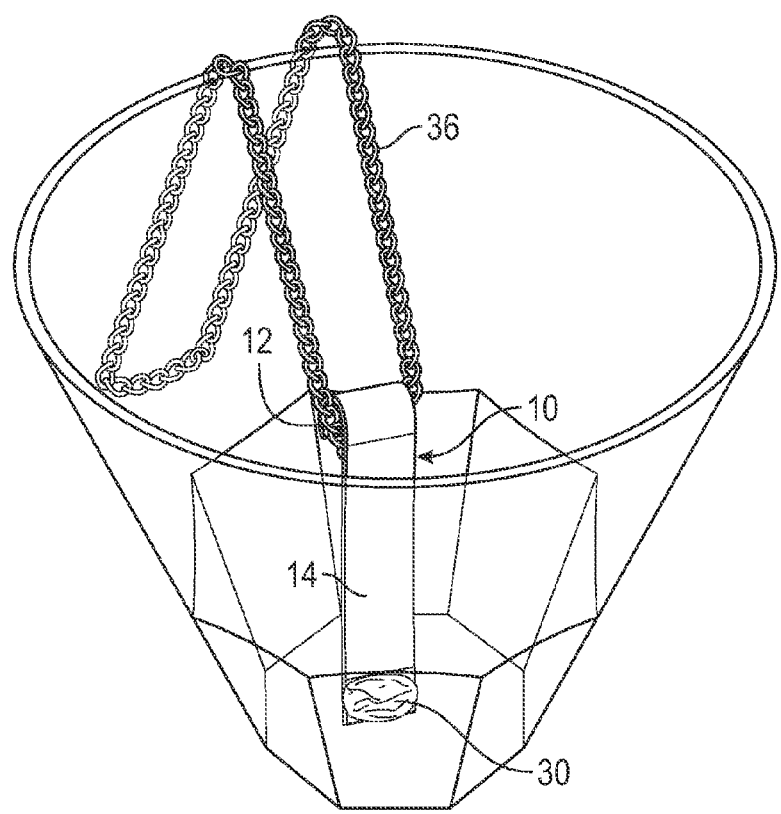
FIG. 9 illustrates the device secured to a chain for adjusting the height of the metered end portion of the device in the glass or other container.

FIGS. 7 to 9 illustrate some alternative methods and devices for suspending device 10 to a lower level in a container, for example where a glass or container is quite tall and the user wishes to suspend the adhered blob 30 of the substance to be dispensed at a lower level in the liquid. For example, in FIG. 7 the hook 12 is engaged over a metal ring 34 which may be a keyring or the like, and a magnet 35 on the outside of the glass is used to raise or lower ring 34. The device may be secured to a keyring in one embodiment, via a hole in the first end of the device. The hook 12 may be omitted in some embodiments if a magnet is used to hold the device with the metered end suspended into the liquid. In FIG. 8, no ring is used but device 10 is made of a ferromagnetic material and is therefore attracted to hand held magnet 35.

In FIG. 9, hook 12 is engaged with an extension member such as chain 36 used to suspend the device 10 in a suitable liquid. Chain may also be used to agitate the device for faster dispersion of the material 30 adhered to the metered end portion of the device. The chain may be temporarily engaged with the hook as in FIG. 9, or may be permanently secured to the hooked end of the device in one embodiment, so that a consumer can either hook the device over the edge of the container or suspend it further into the container, as desired, and has the option of wearing the chain as an item of jewelry when the chain extends through a hole which may be provided in the first end of the device. In the latter case the device may be modified to include decorative features or designs, and is then readily available to the wearer for use in the manner described above at all times. Chain 36 may be replaced with any suitable flexible or inflexible extension member attached to the hook, such as a cord, elastic band, string, or the like.

In some embodiments, a dispersing device 10 may be supplied as an accessory with each container of a paste like or sticky substance to be dispersed or dissolved in a liquid.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A combination of a container which contains a paste-like or sticky substance and a device for dispersing a quantity of the paste-like or sticky substance to dissolve in a liquid, comprising:
    a first container of mineral pitch resin; and
    a device for dispersing a measured quantity of the mineral pitch resin from the first container to dissolve in a liquid, the device comprising an elongate member having an outer face, an inner face, and opposite first and second ends;
    an outwardly directed hook at the first end of the device for suspending the elongate member from the rim of a second container into the interior of the second container;
    the elongate member having a metered collection portion adjacent the second end configured for collection of an amount of mineral pitch resin from the first container, whereby the collected amount is adhered to the collection portion prior to dispersing of the collected mineral pitch resin into a liquid in the second container; and
    the elongate member having a scale marking at least on the inner face and spaced a predetermined distance from the second end for indicating an amount of mineral pitch resin adhered to the collection portion between the scale marking and second end.

2. The combination of claim 1, wherein the device is formed from a substantially flat strip of material bent at the first end to form the hook.

3. The combination of claim 1, wherein the scale marking comprises at least one line.

4. The combination of claim 3, wherein the scale marking comprises a plurality of lines spaced at different distances from the second end.

5. The combination of claim 1, wherein a second scale marking identical to the scale marking on the inner face is provided on the outer face of the elongate member at the same spacing from the second end.

6. A device for dispersing a paste-like or sticky substance to dissolve in a liquid, comprising:
    an elongate member having an outer face, an inner face, and opposite first and second ends;
    the elongate member having a metered collection portion adjacent the second end configured for insertion into a container of a paste-like or sticky substance so that an amount of paste-like substance adheres to the collection portion;
    an outwardly directed hook at the first end of the elongate member for suspending the elongate member from the rim of a second container holding a quantity of liquid into the interior of the second container;
    the elongate member having a scale marking at least on the inner face and spaced a predetermined distance from the second end for indicating an amount of paste-like substance adhered to the collection portion between the scale marking and second end; and
    an extension member secured to the hook for suspending the elongate member into the second container to a depth greater than a length of the elongate member, wherein the extension member is selected from the group consisting of a chain, a cord, an elastic band, and a string.

7. The device of claim 6, wherein the extension comprises a chain.

8. The combination of claim 1, wherein the elongate member is of ferromagnetic material.

9. A method of dispersing a measured quantity of paste-like or sticky substance in a liquid, comprising:
    inserting a metered end portion at one end of an elongate dispersing device into a container of paste-like or sticky substance so that a quantity of the substance adheres to the metered end portion, the paste-like or sticky substance comprising a mineral pitch resin;
    submerging the metered end portion holding the mineral pitch resin in a quantity of liquid in a second container; and
    allowing the mineral pitch resin to disperse and dissolve into the liquid, whereby any non-soluble solid contaminants contained in the substance fall to the bottom of the second container.

10. The method of claim 9, wherein the step of submerging the metered end portion comprises engaging a hook at an opposite end of the elongate dispersing device to the metered end portion over a rim of the second container holding the quantity of liquid, whereby the metered end portion holding the mineral pitch resin is submerged in the liquid.

11. The method of claim 10, further comprising removing the hook from the rim of the second container, associating the hook with an extension member and lowering the device deeper into the liquid in the second container using the extension member.

12. A method of dispersing a measured quantity of paste-like or sticky substance in a liquid, comprising:
    inserting a metered end portion at one end of an elongate dispersing device into a container of paste-like or sticky substance so that a quantity of the substance adheres to the metered end portion;
    associating a hook at the opposite end of the elongate dispersing device to the metered end portion with an extension member, wherein the extension member is selected from the group consisting of a chain, a cord, an elastic band, and a string;
    lowering the device into a second container holding a quantity of liquid using the extension member;

submerging the metered end portion holding the paste-like or sticky substance in the quantity of liquid in the second container; and allowing the paste-like or sticky substance to disperse and dissolve into the liquid;

whereby any non-soluble solid contaminants contained in the substance fall to the bottom of the second container.

13. The method of claim 9, wherein the step of submerging the metered end portion comprises placing a magnet on the outside of the second container to attract the opposite end of the dispensing device from the metered end portion, and moving the magnet in order to lower the dispensing device to a deeper depth in the liquid until the metered end portion is submerged.

14. The method of claim 9, wherein the second container is of transparent or translucent material and the liquid is transparent or translucent, whereby a user can observe the paste-like substance dissolving in the liquid and any solid, non-soluble contaminants falling to the bottom of the second container.

* * * * *